B. BRADLEY, Sr.
RAILROAD TIE.
No. 11,596. Reissued Apr. 6, 1897.
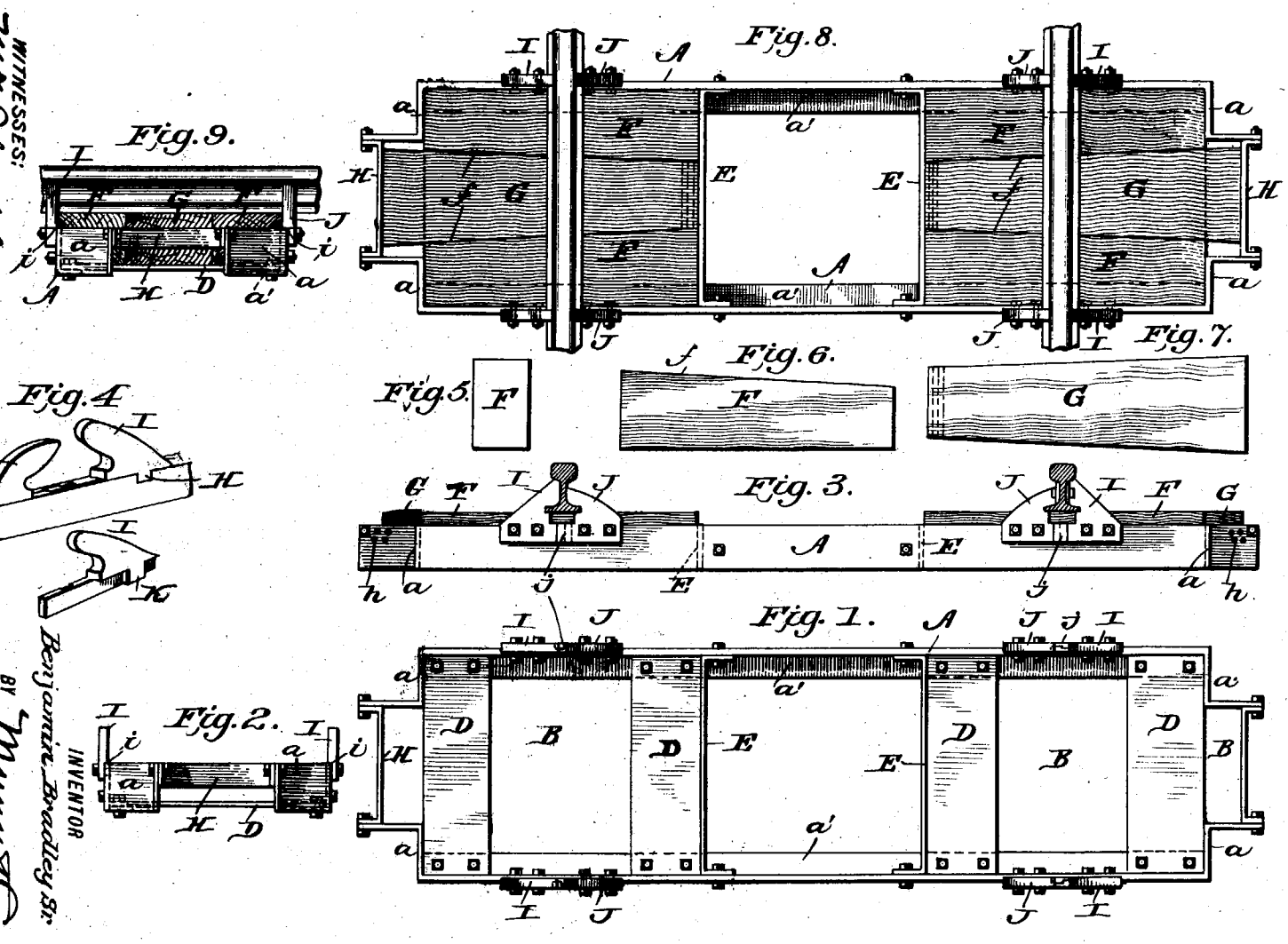
WITNESSES:
W. S. Blondell
P. B. Turpin.
INVENTOR
Benjamin Bradley Sr.
BY Munn & Co.
ATTORNEYS.

UNITED STATES PATENT OFFICE.

BENJAMIN BRADLEY, SR., OF BELLEFONTE, PENNSYLVANIA.

RAILROAD-TIE.

SPECIFICATION forming part of Reissued Letters Patent No. 11,596, dated April 6, 1897.

Original No. 577,714, dated February 23, 1897. Application for reissue filed March 12, 1897. Serial No. 627,229.

*To all whom it may concern:*

Be it known that I, BENJAMIN BRADLEY, Sr., of Bellefonte, in the county of Centre and State of Pennsylvania, have invented a new and useful Improvement in Railroad-Ties, of which the following is a specification.

My invention is an improvement in railroad-ties, and has for its objects, among others, to provide a durable and efficient tie the removable blocks or wearing parts of which can be readily replaced; and the invention consists in certain novel constructions, combinations, and arrangements of parts, as will be hereinafter described, and pointed out in claims.

In the drawings, Figure 1 is a top plan view of the frame. Fig. 2 is an end view of the frame. Fig. 3 is a side view thereof. Fig. 4 is a detail view of one form of rail-lock. Figs. 5, 6, and 7 are detail views of the bearing-blocks. Fig. 8 is a top plan view of the tie with the rails in place, and Fig. 9 is an end view of the tie with the rails in place.

The tie is formed with a metallic frame having main plates A A, of angle-iron, steel, or the like, which plates are bent in or offset at *a* near their ends, forming chambers B, in which the bearing-blocks are fitted and held. The base-wings *a'* of the angle-plates A form seats for the base-plates D, which rest thereon and are riveted or bolted in position. These base-plates D are arranged in pairs, one pair for each rail, and are spaced apart, the rail resting above the space between them, thus securing the advantage incident to the use of a wood or similar bearing-block, insuring more elasticity for rolling-stock and neutralizing the rigidity of iron frame-bearings. At the inner edges of the inner base-plate of each pair I provide cross-bars E, connecting the main plates and forming the inner walls of the chambers for the bearing-blocks and also bracing the main plates.

The bearing-blocks F, F, and G rest upon the base-plates and fit within the chambers B, snugly between the main plates A A. The outer blocks F are inclined on their inner edges *f* and fit snugly between the cross-bars E and the offsets *a*. The block G is wedge shape and fits between the blocks F and is made longer than the blocks F, so its point may be cut off and it driven in from time to time to take up shrinkage. These wedge-blocks are held by the bars H, which connect the ends of the main plates, and these bars H may be set in from time to time to correspond with the adjustments of the wedge-block, a plurality of holes *h* being provided for the bolts securing said bars H, so the latter can be set in as may be required. These blocks F and G project above the frame, so the rails will not bear upon the metal. I may in practice make the blocks of wood, paper, grass, wood-pulp, cotton, or other substance suitable for the purpose.

The bearing-blocks, being made alike for the different widths of ties, could be seasoned and painted before using, thus making them last longer, and when necessary such blocks can be readily replaced without removing the main portion or frame of the tie, the manipulation of the bearing-blocks being easily effected through the ends of the main frame, which can be opened by removing the cross-bars H. The frame when in position and properly ballasted is practically indestructible.

The rail-locks I and J fit the outer and inner sides of the rails and are bolted to the plates A A, being provided with shoulders *i*, resting on the upper edges of the said plates, as shown in Fig. 2. These locks I and J are hooked together at *j* and fit in the hollow of the rails, the outer locks I bearing snugly up against the under side of the ball of the rail, while the inner locks J hook firmly over the base of the rails. Where these locks come opposite fish-plates, they must be formed accordingly, as will be understood from the lock at the right in Fig. 3. For narrow ties (or curves of railroad) the outside locks may be notched in the upper edge of the plate A, with a lug K on the lock to enter the notch of the plate, as shown in Fig. 4.

It will be understood that my invention avoids the necessity of spikes and dispenses with their use.

By covering the frame with ballast expansion and contraction from heat and cold would be very slight.

In practice I will make the ties from about twelve to thirty inches wide, the wide ties for use where the road is straight and the narrow ones for curves, the construction being substantially alike in both instances.

Having thus described my invention, what I claim as new, and desire to secure by reissue, is—

1. A tie comprising the metallic frame having the main plates of angle-iron the base-plates resting on the lower wings of said main plates and the bars connecting said main plates substantially as shown and described.

2. A tie comprising the frame having main plates provided near their ends with offsets extending at right angles to the direction of length of the tie and forming the outer end walls of the bearing-block chambers and with cross-bars forming the inner walls of said chambers and the bearing-blocks fitted in said chambers substantially as shown and described.

3. In a tie the combination with the frame of the outer bearing-blocks, and the inner wedge-block such blocks having inclined faces whereby the inner block may be set up to take up wear, &c., substantially as shown and described.

4. A tie consisting of the frame having main plates of angle-iron and provided near their ends with offsets, the base-plates resting on the lower wings of the main plates, the cross-bars connecting the main plates and forming the inner walls of the bearing-block chambers, the bearing-blocks in said chambers, and the end cross-bars connecting the main plates all substantially as shown and described.

5. The combination with the tie-frame, of the rail-locks hooked together and secured to the tie-frame substantially as shown and described.

6. A tie composed of the metal frame, and the removable wear-blocks held in said frame and consisting of the outer blocks and the inner wedge-blocks such blocks being arranged at their upper faces to support the rail and the inner block being tapered and movable longitudinally in the direction of length of the tie whereby it may be set longitudinally without affecting the bearing-plane for the base of the rail substantially as shown and described.

7. The combination of the tie-frame having a notch and the rail-locks hooked together and secured to the tie-frame one of such locks having a lug entering the notch of the tie-frame substantially as shown and described.

BENJAMIN BRADLEY, SR.

Witnesses:

ROBT. COLE,

H. K. MILLER.